(12) United States Patent
Ogawa et al.

(10) Patent No.: US 6,448,863 B1
(45) Date of Patent: Sep. 10, 2002

(54) DIFFERENTIAL TRANSMISSION CABLE AND JOINT WITH SPECIFIC DISTANCES

(75) Inventors: Tomomi Ogawa; Toshikazu Nishiyama; Hirokazu Araki, all of Saitama-ken; Katsuhiro Okada, Tokyo; Yasuo Tani; Osamu Ikemoto, both of Tottori-ken, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/556,937

(22) Filed: Apr. 21, 2000

(30) Foreign Application Priority Data

Apr. 22, 1999 (JP) ............................. 11-114754
Jul. 12, 1999 (JP) ............................. 11-197118

(51) Int. Cl.$^7$ ................................. H03H 7/01
(52) U.S. Cl. .................. 333/12; 333/181; 333/185; 439/620
(58) Field of Search ............... 333/12, 177, 181, 333/182, 185; 439/620

(56) References Cited

U.S. PATENT DOCUMENTS

| | | | |
|---|---|---|---|
| 4,777,455 A | * 10/1988 | Sakamoto et al. | 333/12 |
| 5,587,884 A | * 12/1996 | Raman | 333/182 |
| 5,982,253 A | * 11/1999 | Perrin et al. | 333/182 |
| 6,027,366 A | * 2/2000 | Mori et al. | 439/495 |

FOREIGN PATENT DOCUMENTS

| | | | |
|---|---|---|---|
| EP | 0 844 697 A2 | 11/1997 | |
| JP | 08-055726 A | * 2/1996 | 333/185 |
| JP | 08084124 A | 3/1996 | |
| JP | 10-208818 | 8/1998 | |

* cited by examiner

*Primary Examiner*—Justin P. Bettendorf
(74) *Attorney, Agent, or Firm*—Sughrue Mion, PLLC

(57) ABSTRACT

The differential transmission cable comprises a cable having at least one pair of differential transmission lines, one or more transmission transformers, and connectors at both ends, the transmission transformer having an integrally sintered laminate structure and a coupling coefficient of 0.65 to 0.98 at 100 MHz, the distance between a center of the transmission transformer and a tip end of the closest connector being within 0.1 m, and the distance between a center of the transmission transformer and a tip end of the farthest connector or between a center of the transmission transformer and a center of the other transmission transformer being 0.5 to 4 m. The transmission transformer is mounted onto a substrate, which is inserted into the connector or a housing of the connector having lands or a positioning holder. After wiring, the connector including the substrate is integrally resin-molded.

24 Claims, 12 Drawing Sheets

Distance a (m) Between Transmission Transformer and End of Connector

Distance b (m) Between Transmission Transformer and Connector or Transmission Transformer on the Far End

DIFFERENTIAL TRANSMISSION CABLE AND JOINT WITH SPECIFIC DISTANCES

FIELD OF THE INVENTION

The present invention relates to a differential transmission cable capable of suppressing radiation noise and a joint for connecting such a differential transmission cable to a device.

DESCRIPTION OF PRIOR ART

The differential transmission cable is a transmission cable for use in a differential transmission system, which is a digital transmission system for sending digital signals in apposite directions through a pair of lines with or without bias. Seeing the lines of the differential transmission system from far, high-frequency components are theoretically cancelled, emitting no radiation noise. Accordingly, the differential transmission system is put into practical use to send digital signals between computers and their peripheral devices. The transmission standards of digital signals transmitted through differential transmission cables include a universal serial bus (USB), IEEE1394, etc.

Because outside noise conveyed in the air are equivalently induced in a pair of lines, there is theoretically no likelihood that the outside noise disturbs the transmission of signals. Accordingly, it has been considered that the differential transmission cables are free from problems of radiation noise and outside noise.

However, actual differential transmission cables are likely to generate radiation noise. One of the causes therefor is that noise current and thus radiation noise are generated by the uncancelled difference between a pair of digital signals that is caused by the destroyed balance of the differential transmission signals. Another cause is that conduction noise generated from personal computers and peripheral devices flow through the transmission cables, generating radiation noise.

Those harmful among these radiation noises should of course be coped with. One of the conventional means for suppressing noise is disclosed, for instance, by Japanese Patent Laid-Open No. 8-84124. This means is made for usual transmission cables. Specifically, it includes induction elements, capacitance elements, common-mode choke coils, low-pass filters (T-type filters), etc. inserted into transmission systems.

Another cable having noise-suppressing means may be a cable comprising differential transmission lines. Japanese Patent Laid-Open No. 10-208818 discloses a differential transmission cable comprising two sets or more of differential transmission lines, each set of differential transmission lines comprising ferrite beads. In this differential transmission cable, when signals of the same phase are transmitted through a pair of transmission lines, magnetic flux generated by the signals does not adversely affect (interfere with) the other sets of transmission lines.

However, the above conventional differential transmission cable attenuates high-frequency components in digital signals, resulting in the deformation of the digital waveform. On the other hand, if the quality of the digital signal is to be kept, only insufficient attenuation would be obtained in radiation noise. Because the digital signals comprise basic frequency components and harmonic wave components of odd power higher than the basic frequency by one order or more, the removal of the harmonic wave components (high-frequency components) means nothing other than the degradation of the quality of digital signal waveform. That is, keeping the quality of the digital signal waveform is in a contradictory relation with the suppression of radiation noise. The above conventional technology is thus unsatisfactory in suppressing radiation noise while keeping the quality of the digital signal waveform.

OBJECT OF THE INVENTION

Accordingly, an object of the present invention is to provide an inexpensive, highly reliable, differential transmission cable capable of dramatically attenuating radiation noise while fully keeping the quality of digital signal waveform, and a joint for connecting such a differential transmission cable to a device.

SUMMARY OF THE INVENTION

Thus, the first differential transmission cable of the present invention comprises a cable having at least one pair of differential transmission lines, one or more transmission transformers, and connectors at both ends, the distance between a center of the transmission transformer and a tip end of the closest connector being within 0.1 m, and the distance between a center of the transmission transformer and a tip end of the farthest connector or between a center of the transmission transformer and a center of the other transmission transformer being 0.5 to 4 m.

The second differential transmission cable of the present invention comprises a cable having at least one pair of differential transmission lines, one or more transmission transformers, and connectors at both ends, the distance between a center of the transmission transformer and a tip end of the closest connector being within $\lambda/20$, and the distance between a center of the transmission transformer and a tip end of the farthest connector or between a center of the transmission transformer and a center of the other transmission transformer being $\lambda/4$ to $2\lambda$, wherein $\lambda$ represents the wavelength of a noise that radiates from the differential transmission cable and should be attenuated.

In one embodiment of the present invention, one transmission transformer is disposed in the vicinity of one end of each pair of differential transmission lines. In another embodiment of the present invention, two transmission transformers are disposed in a pair of differential transmission lines, one transmission transformer being disposed near one end of a pair of the differential transmission lines, and the other transmission transformer being disposed near the other end of a pair of the differential transmission lines.

The transmission transformer desirably has such small shape and size that it can be contained in the differential transmission cable in a compact manner. For this purpose, the transmission transformer is preferably a sintered transformer of an integral laminate type or a thin-film-type transformer. The transmission transformer preferably has a coupling coefficient of 0.65 to 0.98 at 100 MHz.

The transmission transformer is preferably disposed in the differential transmission lines and/or the connector. When the transmission transformer is mounted in the connector, the transmission transformer is mounted onto a substrate, which is then resin-molded in the connector. Also, when the transmission transformer is disposed in a housing of a connector, the housing is preferably provided with lands for mounting the transmission transformer and a holder for positioning the transmission transformer. The holder for positioning the transmission transformer is preferably in a shape having a hook in an upper portion.

A part of each land for mounting the transmission transformer is preferably constituted by terminals of the connector. Also, each land is preferably provided with a waist portion. The lands on the side of mounting the transmission transformer may be of a contact pin type. In the resin-molding of parts, a molten resin is injected into a die in which parts to be assembled are disposed, to provide an integral molding.

The joint for connecting at least one pair of differential transmission cables for transmitting differential transmission signals to a device has a structure in which a transmission transformer is mounted in pairs of transmission lines, the transmission transformer being mounted onto a substrate, which is resin-molded in a male connector.

It is preferable that the substrate is resin-molded in at least one of male and female connectors, and that the joint is as short as 0.1 m or less. It is also preferable that the transmission transformer is disposed in a housing of the male connector, and that the housing is provided with lands for mounting the transmission transformer and a holder for positioning the transmission transformer.

It is further preferable that the transmission transformer is disposed in at least one of male and female connectors, that the housing is provided with lands for mounting the transmission transformer and a holder for positioning the transmission transformer, and that the joint is as short as 0.1 m or less.

A part of each land for mounting the transmission transformer is preferably constituted by terminals of the connector. Also, each land for mounting the transmission transformer preferably has a waist portion. Further, the lands on the side of mounting the transmission transformer are preferably of a contact pin type. Further, the holder for positioning the transmission transformer is preferably in a shape having a hook in an upper portion. Further, noise-suppressing parts other than the transmission transformer are preferably inserted together into the connector.

DESCRIPTION OF THE BEST MODE

[1] Differential Transmission Cable (A) Overall Structure of Cable

Figure 1:
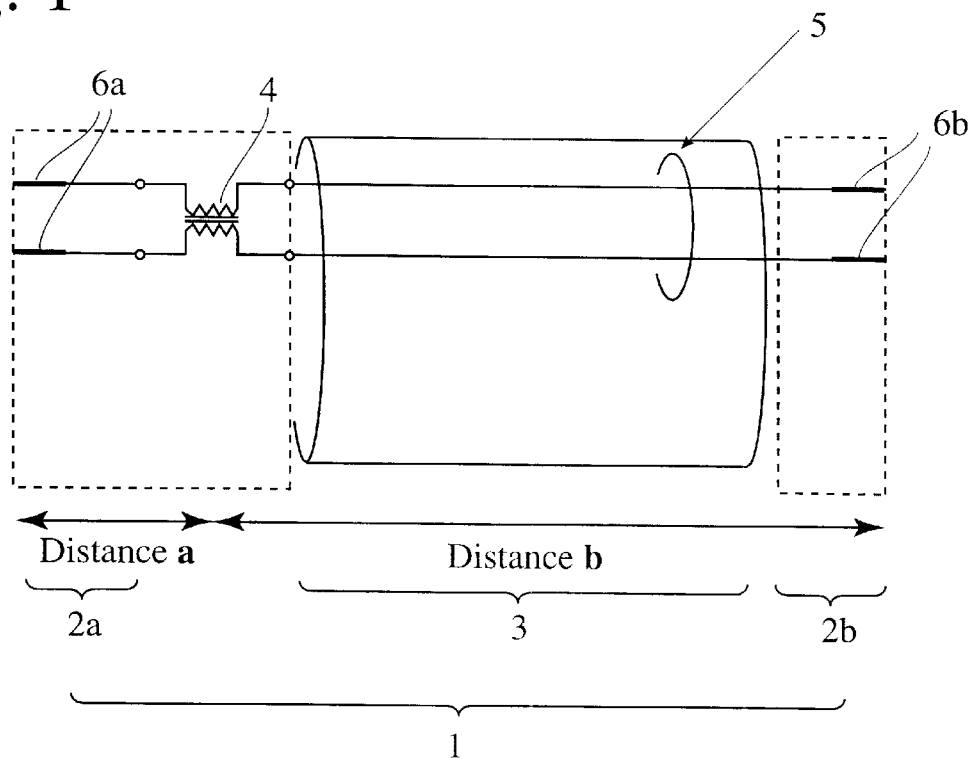
FIG. 1 is a schematic view showing a differential transmission cable according to one embodiment of the present invention.

As shown in FIG. 1, the differential transmission cable 1 according to one embodiment of the present invention comprises a cable 3 having at least one pair of differential transmission lines 5, one or more transmission transformers 4, and connectors 2a, 2b at both ends, the distance a between a center of the transmission transformer 4 and a tip end of the closest connector 2a being within 0.1 m, and the distance b between a center of the transmission transformer 4 and a tip end of the farthest connector 2b or between a center of the transmission transformer 4 and a center of the other transmission transformer (not shown) being 0.5 to 4 m. The term "distance" used herein means the length of the line. When three or more transmission transformers are mounted in the differential transmission cable 1, the distance b between the adjacent transmission transformers should also be within the range of 0.5 to 4 m. Accordingly, the entire length of the cable should substantially be integer times the unit length of 0.5 to 4m.

The most important features of the present invention are that the differential transmission cable 1 functions as a noise-emitting antenna, and that the position of the transmission transformer 4 mounted in the differential transmission cable 1 is optimized to decrease the emitting sensitivity of the antenna at the noise frequency. The transmission transformer 4 mainly functions to (a) selectively attenuate only noise components (skew noise) remaining after cancellation due to the destroyed balance of differential transmission signals among a pair of digital signals transmitted through the cable 3, and (b) adjust the position of the node of a radiating wave in a case where the transmission cable 3 is regarded as an antenna.

With respect to the function (a), when the distance between a center of the transmission transformer 4 and a tip end of the closest connector 2a is more than 0.1 m, there are large noise components remaining after cancellation in the differential transmission signals, making it necessary to use a transmission transformer 4 having a large impedance to remove such noise components. As a result, it is difficult to keep the quality of digital waveform. Thus, this distance should be 0.1 m or less, preferably as small as possible.

Explaining the function of (b) from a different angle, whatever noise may exist in the cable 3, it is necessary is to keep such noise from radiating from the cable as harmful noise. When the cable 3 is as short as 4 m or less, the desired object can be achieved. On the other hand, when a cable shorter than 0.5 m is used, a large number of transmission transformers 4 are needed, and there is less necessity of using transmission transformers because there is essentially little radiation from the differential transmission cable 1.

The position of the transmission transformer 4 is preferably determined, such that the distance between a center of the transmission transformer 4 and a tip end of the closest connector 2a is within $\lambda/20$, and that the distance between a center of the transmission transformer 4 and a tip end of the farthest connector 2b or between a center of the transmission transformer 4 and a center of the other transmission transformer (not shown) is $\lambda/4$ to $2\lambda$, wherein $\lambda$ represents the wavelength of a noise that radiates from the differential transmission cable 1 and should be attenuated. Better effects can be obtained when the distance between a center of the transmission transformer 4 and a tip end of the farthest connector 2b or between a center of the transmission transformer 4 and a center of the other transmission transformer (not shown) is $3\lambda/2$ or less. When it is equal to or less than $\lambda$, the most remarkable effects can be obtained, enabling the suppression of the radiation noise. With respect to the lower limit of the distance, it is preferably $\lambda/4$ for the same reasons as above. When there are three or more transmission transformers mounted in the differential transmission cable 1, the distance b between the adjacent transmission transformers is also within the range of $\lambda/4$ to $2\lambda$. Accordingly, the entire length of the cable is substantially integer times the unit length of $\lambda/4$ to $2\lambda$.

At least one transmission transformer 4 is mounted near one end of a pair of differential transmission lines 5. The term "near one end" used herein means that the transmission transformer 4 may be positioned near an end of either one of a pair of differential transmission lines 5. Accordingly, the transmission transformer 4 is preferably on the data transmission side of the differential transmission signals (on the side of a noise-generating source), though it is not indispensable.

When the differential transmission cable comprises plural pairs of differential transmission lines 5, it is not necessary to take into consideration the relations between pairs of differential transmission lines 5. Accordingly, one or more transmission transformers 4 may be disposed on both ends. Also, to provide a differential transmission cable 1 always exhibiting efficient effects whichever side the noise-generating source is disposed, the transmission transformers 4 are preferably disposed near both ends.

(B) Transmission Transformer

The transmission transformer 4 should have such a shape and a size that it can be mounted in the connector. For instance, it is preferable to use a sintered laminate transformer having a 3216 size (3.2 mm×1.6 mm) or less or a wound-coil-type or thin-film-type transformer. It is particularly preferable to use the transformer having a coupling coefficient of 0.65 to 0.98 at 100 MHz. This is based on the findings that (a) the coupling coefficient is effectively 0.98 or less at 100 MHz so that the transmission transformer 4 fully serves as a node of a wave when the differential transmission cable 1 is regarded as an antenna, and (b) the coupling coefficient is effectively 0.65 or more at 100 MHz to keep the quality of digital waveform of the differential transmission signals. The present invention can exhibit more remarkable effects when the coupling coefficient is 0.75 to 0.95 at 100 MHz, and most remarkable effects when the coupling coefficient is 0.85 to 0.92 at 100 MHz.

(C) Constitution of Connector

The position of the transmission transformer 4 in the differential transmission cable 1 may be properly determined from the aspect of workability, etc., and it is preferable to dispose the transmission transformer 4 in the connector 2a or 2b, between the connector 2a or 2b and the differential transmission lines 5, or in part of the differential transmission lines 5 in series. However, to minimize the production cost and to provide an inexpensive, reliable structure, the transmission transformer is preferably mounted onto a substrate, which is integrally resin-molded in the connector. With this structure, skew noise and radiation noise can be suppressed. Also, when there are plural pairs of differential transmission lines as in IEEE1394, signals of the same phase can be transmitted through a pair of transmission lines, with a magnetic flux generated by the signals removed by a common-mode impedance, thereby preventing mutual interference harmful to the other pair of the transmission lines. The connector in which the transmission transformer is disposed is preferably a connector on the side of a noise-generating source.

Figure 9:
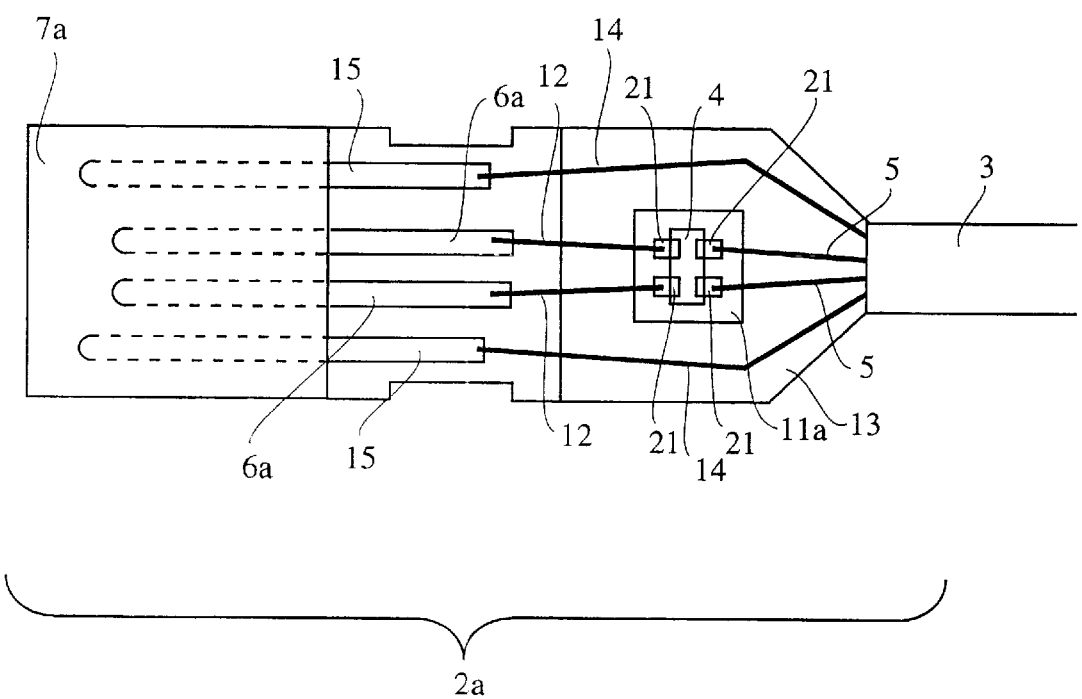
FIG. 9 is a plan view showing a connector in the differential transmission cable according to one embodiment of the present invention.

In the connector 2a in the differential transmission cable 1 shown in FIG. 9, for instance, the transmission transformer 4 is mounted to lands 21 of the substrate 11a, with each signal line 5 and each lead line 12 soldered to each land 21 of the substrate 11a, and integral resin-molding is carried out including these parts. By the structure that the transmission transformer 4 is mounted to the substrate 11a, and that the lands 21 are formed on the substrate 11a, it is possible to achieve high reliability in soldering of the signal lines 5 and the lead lines 12 to the transmission transformer 4. Also, high reliability can be achieved in resin-molding the substrate 11a, to which the transmission transformer 4 is mounted, in the connector 2a. Further, because a commercially available housing can be used in inserting the transmission transformer 4 into the connector 2a, a special connector 2a is not needed. For the above-mentioned reasons, it is possible to provide an inexpensive, highly reliable differential transmission cable that can keep high quality of digital signals waveform with large attenuation of radiation noise.

Figure 13:
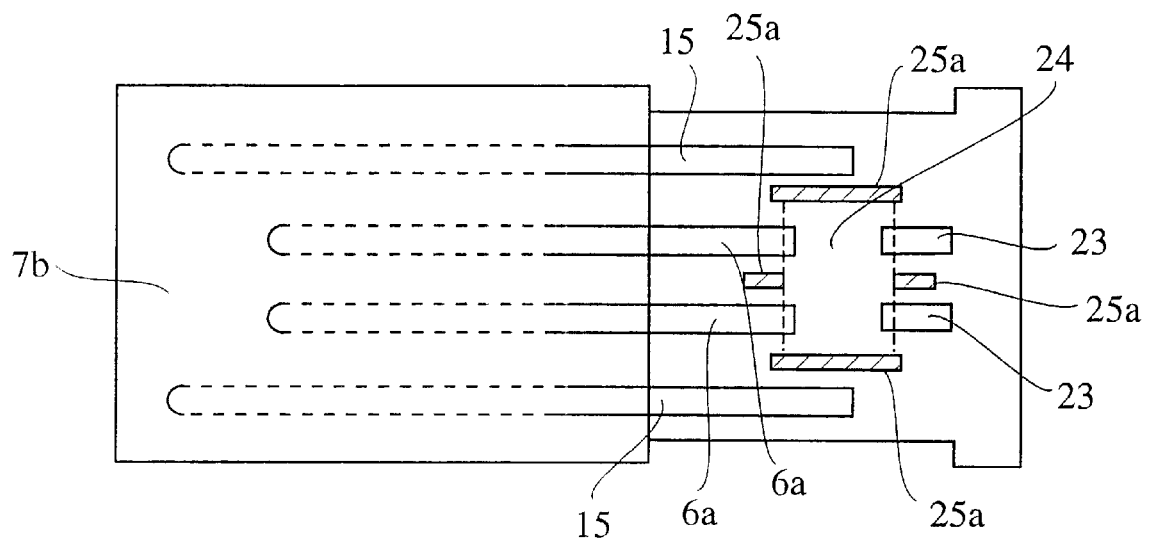
FIG. 13 is a plan view showing a housing of a connector according to another embodiment of the present invention.
Figure 14:
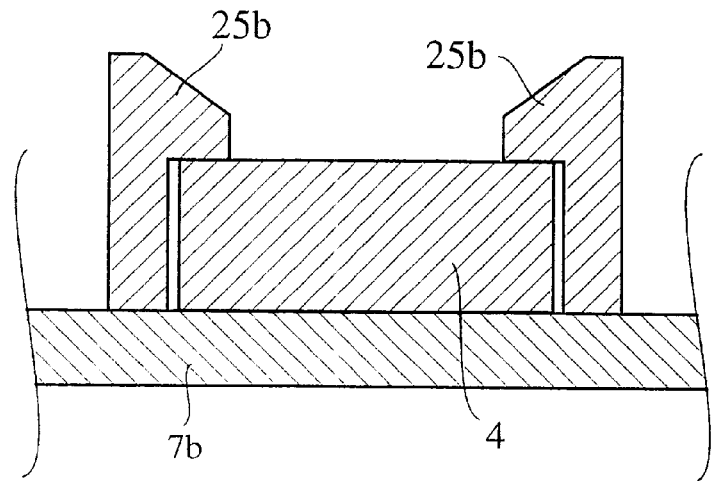
FIG. 14 is a vertical cross-sectional view showing an example of a holder for positioning a transmission transformer.

As shown in FIG. 13, the housing may be provided with lands 23 for mounting a transmission transformer, and a positioning holder 25a is disposed in a site 24, in which the transmission transformer 4 is disposed. With this structure, it is possible to reduce the defect that the position of the transmission transformer mounted to the housing deviates from a desired position. With a holder 25b for the transmission transformer 4 in a shape having a hook in an upper portion as shown in FIG. 14, the deviation of position of the transmission transformer 4 can be prevented at the time of mounting.

Figure 15:
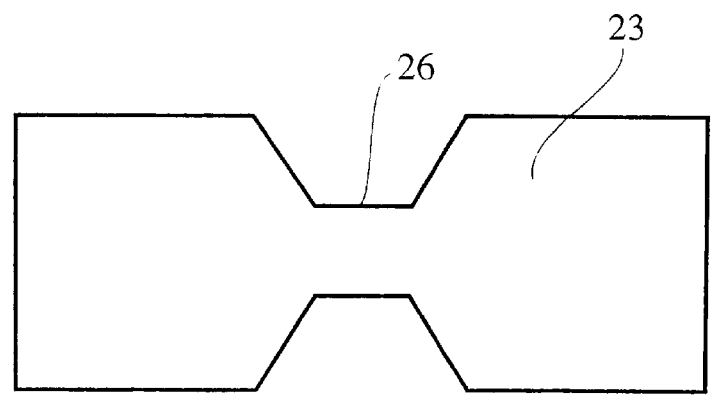
FIG. 15 is a plan view showing an example of a land provided in a connector in the differential transmission cable.
Figure 16:
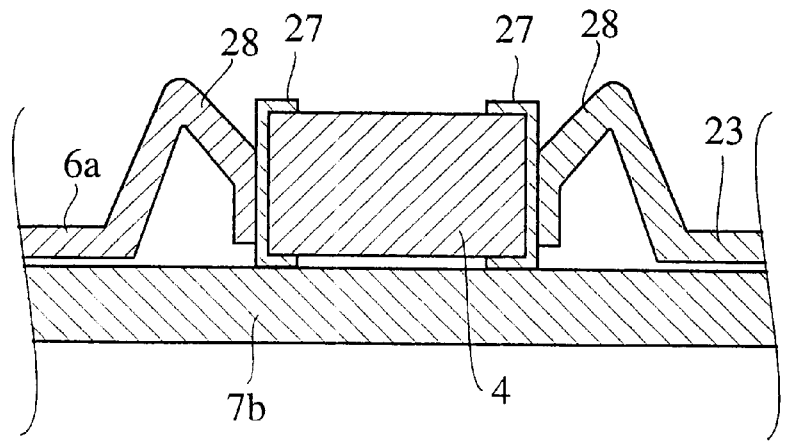
FIG. 16 is a vertical cross-sectional view showing another example of lands provided in a connector in the differential transmission cable.

By providing the land 23 with a waist portion 26 as shown in FIG. 15, heat is less likely to be conducted to the lands 23 mounting the transmission transformer 4, at the time of soldering of cable lines or lead lines after mounting the transmission transformer 4. As a result, a solder between the lands 23 and the transmission transformer 4 can be prevented from melting, thereby avoiding insufficient electric contact. Also, with lands 28 of a contact pin type as shown in FIG. 16, a soldering step can be omitted at the time of mounting the transmission transformer 4.

Figure 19:
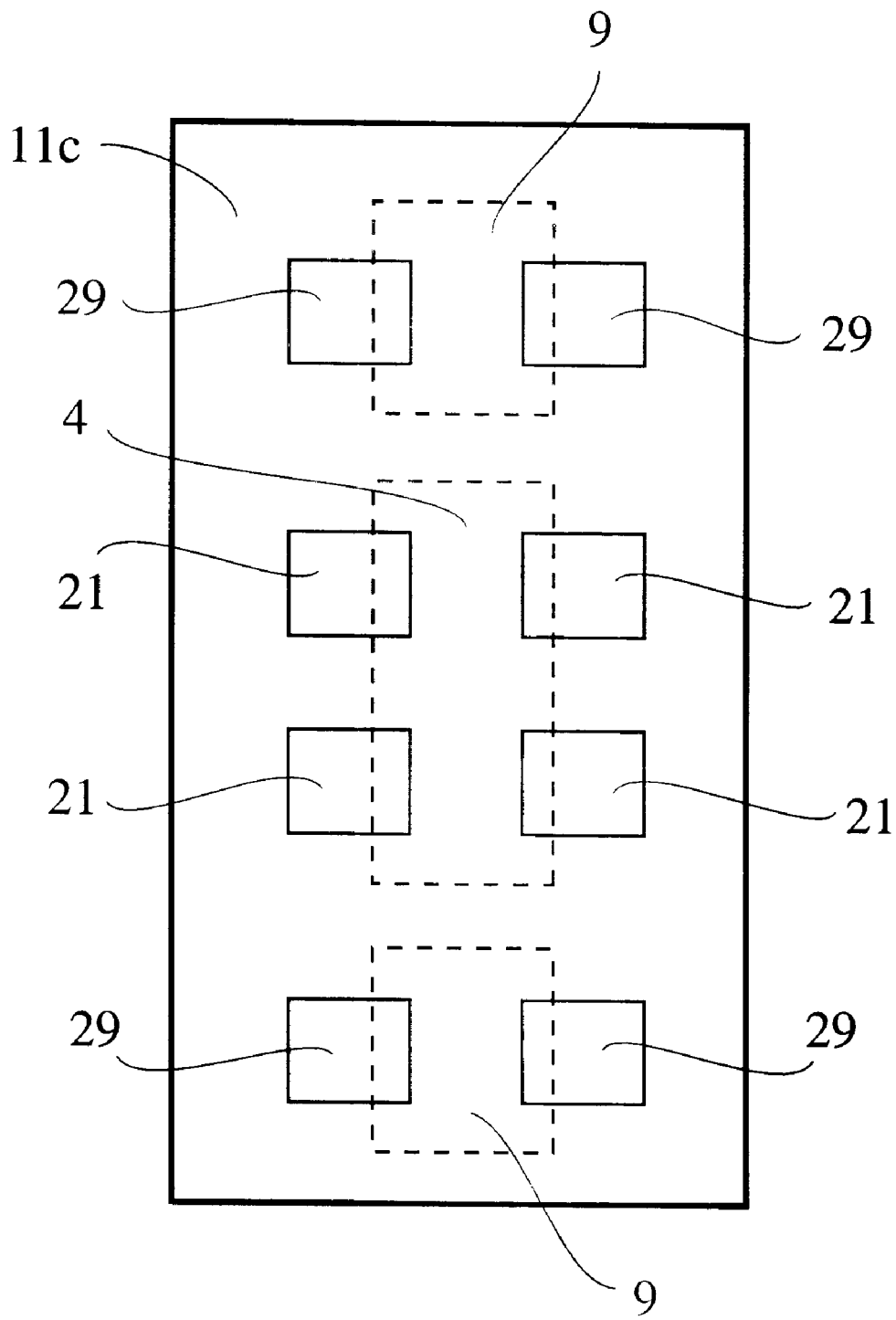
FIG. 19 is a plan view showing a substrate according to another embodiment of the present invention.

By inserting noise-suppressing parts, etc. other than the transmission transformer 4 into the connector, the parallel use of a substrate 11c as shown in FIG. 19, for instance, provides noise-suppressing effects.

For instance, when a chip bead is inserted into the electric power lines, differential-mode noise flowing through the electric power lines can be suppressed. Also by inserting a polymer-type PTC thermistor, the device can be protected from overcurrent. Also, when a chip varistor or a chip surge absorber is inserted, the device can be protected from overvoltage such as static electricity, etc.

[2] Structure of Joint

The joint of the present invention functions to connect at least one pair of differential transmission cables for transmitting differential transmission signals to a transmitting/receiving device. It may be considered that a connector of the transmission cable is replaced by the joint having the same function as that of the connector.

The transmission transformer 4 is disposed in a pair of signal lines in the joint, and the transmission transformer 4 is mounted to a substrate, which is resin-molded in a male connector or in either one of male and female connectors. The length of the joint (length of conductors in the transmission lines from the male connector to the female connector) is preferably within 0.1 m.

Figure 17:
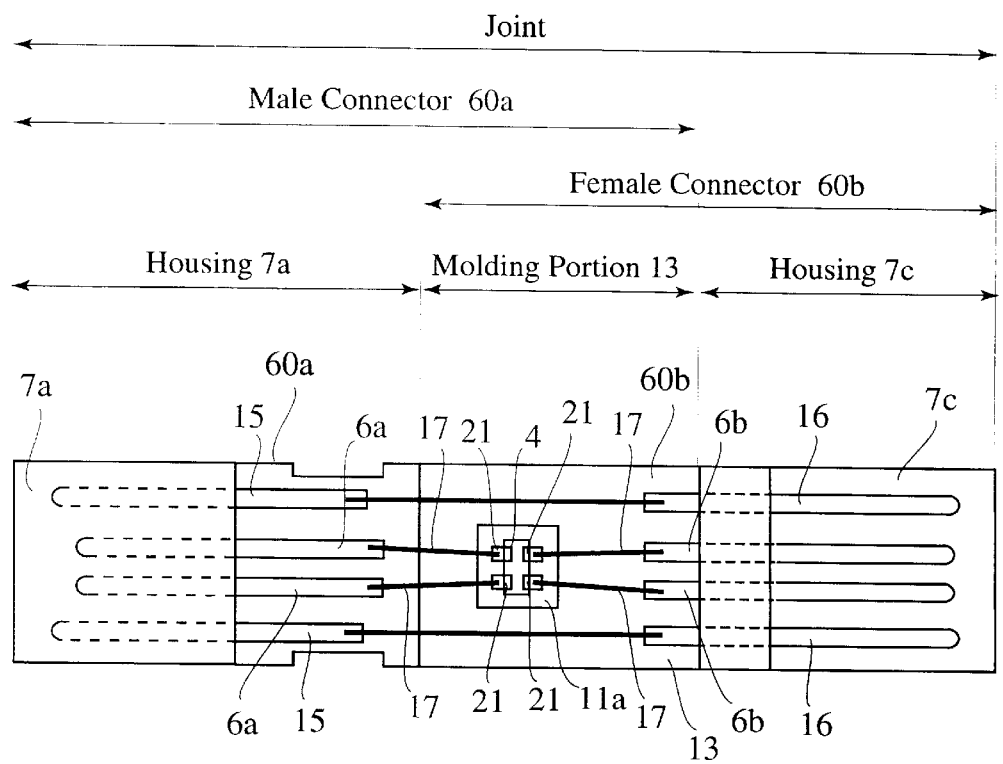
FIG. 17 is a plan view showing a joint according to one embodiment of the present invention.

As shown in FIG. 17, for instance, the joint may be assembled by mounting the transmission transformer 4 to the substrate 11a, connecting the terminals 6a, 15 of the male connector 60a and the terminals 6b, 16 of the female connector 60b to the lands 21 of the substrate 11a via lead lines 17 by solder, resin-molding the male connector 60a, the female connector 60b and the substrate 11a together, and using parts such as a shield plate, etc. This makes it possible to keep reliability in soldering of the lead lines 17 to the transmission transformer 4.

Figure 18:
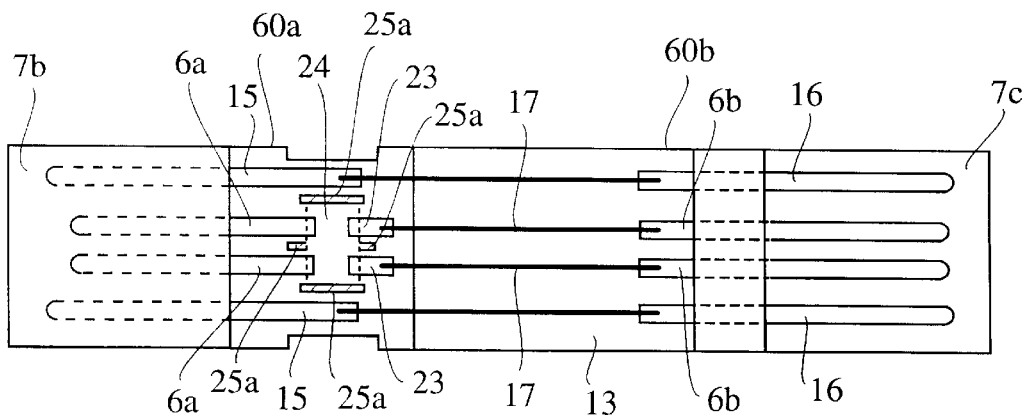
FIG. 18 is a plan view showing a joint according to another embodiment of the present invention.

Also as shown in FIG. 18, with respect to the mounting of a holder 25a for holding the transmission transformer and lands 23 in a site to which the transmission transformer is mounted, the joint may have the same structure as the above connector.

The present invention will be explained in further detail by the following EXAMPLES without intention to restrict the present invention thereto.

EXAMPLE 1, COMPARATIVE EXAMPLE 1

Position of Transmission Transformer and Effects of its Coupling Coefficient

FIG. 1 shows one example of a differential transmission cable having plural pairs of differential transmission lines, one transmission transformer 4 being disposed in each pair of differential transmission lines 5. In FIG. 1, other pairs of differential transmission lines are omitted. In FIG. 1, the distance a represents a distance (line length) between a center of the transmission transformer 4 and a tip end of the closest connector 2a, and the distance b represents a distance (line length) between a center of the transmission transformer 4 and a tip end of the farthest connector 2b or between a center of the transmission transformer 4 and a center of the other transmission transformer (not shown).

In general, a commercially available differential transmission cable such as USB, etc. is constituted by braided differential transmission lines 5, and provided with electric power lines and a shield, though they are not shown in the figure for the simplicity of explanation. It should be noted, however, that the scale reduction ratio and number of parts are not necessarily accurate in the figure.

The differential transmission cable 1 is equipped with a cable 3, and connectors 2a, 2b mounted to both ends of the cable 3, and the connector 2a comprises a transmission transformer 4. The cable 3 comprises plural pairs of differential transmission lines 5 (only one pair of differential transmission lines 5 are shown), and each connector 2a, 2b has terminals 6a, 6b. At least two pin terminals 6a of one connector 2a are connected to one end of a pair of differential transmission lines 5, while at least two pin terminals 6b of the other connector 2b are connected to the other end of a pair of differential transmission lines 5. The interval between a center of the transmission transformer 4 and pin terminals 6a of the closest connector 2a is defined as a distance a, and the interval between a center of the transmission transformer 4 and pin terminals 6b of the farthest connector 2b is defined as a distance b. The center of the transmission transformer 4 is regarded herein as a point at which the distance is measured, though there would be substantially no difference because of the small size of the transmission transformer 4 if the measurement point is positioned at an end of the transmission transformer 4. Portions shown by the dotted line in FIG. 1 represent the connectors 2a, 2b, though the transmission transformer 4 need not necessarily be disposed in the connector 2a.

The transmission transformer 4 disposed in the connector 2a functions not only to selectively attenuate noise components (skew noise) remaining after cancellation due to the destroyed balance of differential transmission signals among a pair of digital signals, but also to prevent the cable itself from acting as a noise-generating source (antenna), thereby suppressing the generation of a radiation noise.

Figure 2:
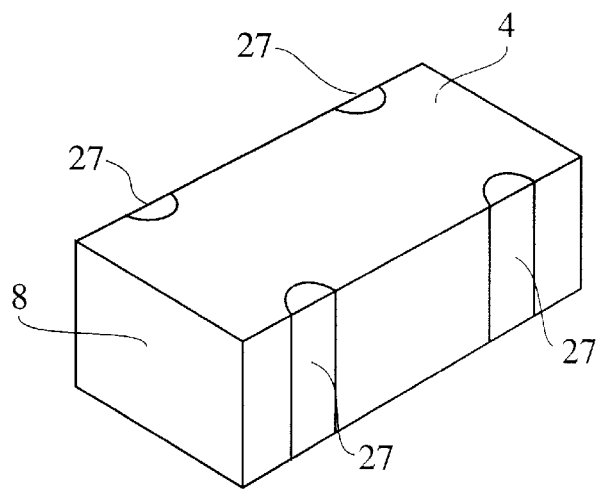
FIG. 2 is a perspective view showing one example of transmission transformers.

An integrally sintered laminate transformer 4 shown in FIG. 2 may be preferably used as the transmission transformer 4. The laminate transformer 4 has a size of 3.2 mm (width)×1.6 mm (length)×1.2 mm (height), for instance, suitable for being mounted to cables such as USB, etc. The laminate transformer 4 was produced though the following steps.

First, a paste of ceramic powder 8 was formed into a green sheet by a doctor blade method. Each green sheet was provided with through-holes at predetermined positions by a drill, and coil patterns and through-hole electrodes were screen-printed with an Ag paste. A plurality of green sheets thus obtained were laminated and bonded together by pressure. The coil patterns were connected to each other via the through-holes to provide two coils sharing magnetic flux. The resultant laminate was cut to a chip size and sintered at 900° C., and then external electrodes 27 were formed to provide a transmission transformer 4 having four terminals and two coils.

Used as ceramics 8 for green sheets were two types of Ni—Cu—Zn soft ferrite having an initial permeability of about 15 and 100, respectively, and three types of Zr—Ca dielectric materials. Each green sheet had a thickness of 30 to 120 μm, and green sheets of various thicknesses were combined for lamination. The coil pattern had a width of 80 to 120 μm, and the printed pattern had a thickness of 5 to 20 μm. The number of printed layers for the coil pattern was 2 to 4. Thus obtained were various transmission transformers 4 having coupling coefficients of 0.5 to 0.98 at 100 MHz.

Used in COMPARATIVE EXAMPLE 1 were various commercially available high-frequency transformers, and each transformer was partially worked to provide a bypass to its magnetic flux path, thereby reducing a coupling coefficient. Thus, transmission transformers 4 having coupling coefficients of 0.90 to 0.99 at 100 MHz were prepared.

With commercially available cables 3 (with connectors 2) adapted to USB and commercially available cables corresponding to them, cables having various distances a were prepared. In the case of the first cable, the connector 2 of the commercially available cable 3 was disassembled, and a portion for holding a transmission transformer 4 was formed by cutting, and a conductor in that portion was removed. Next, a transmission transformer 4 was mounted to that portion, and electrically connected to the front and rear conductors by solder. Thus, a differential transmission cable having a transmission transformer 4 serially inserted into a part of the connector 2 was obtained. The direction of connection of the transmission transformer 4 is different from those of the usual low-frequency transformers, with coils serial to the circuit and parallel to each other.

In the case of the second cable, the same transmission transformer 4 was inserted into the cable at a position at which the connector 2 was cut from the cable 3. Also; in the case of the third cable, the transmission transformer 4 was inserted into the cable 3 at a position at which part of the cable 3 was cut away.

Figure 3:
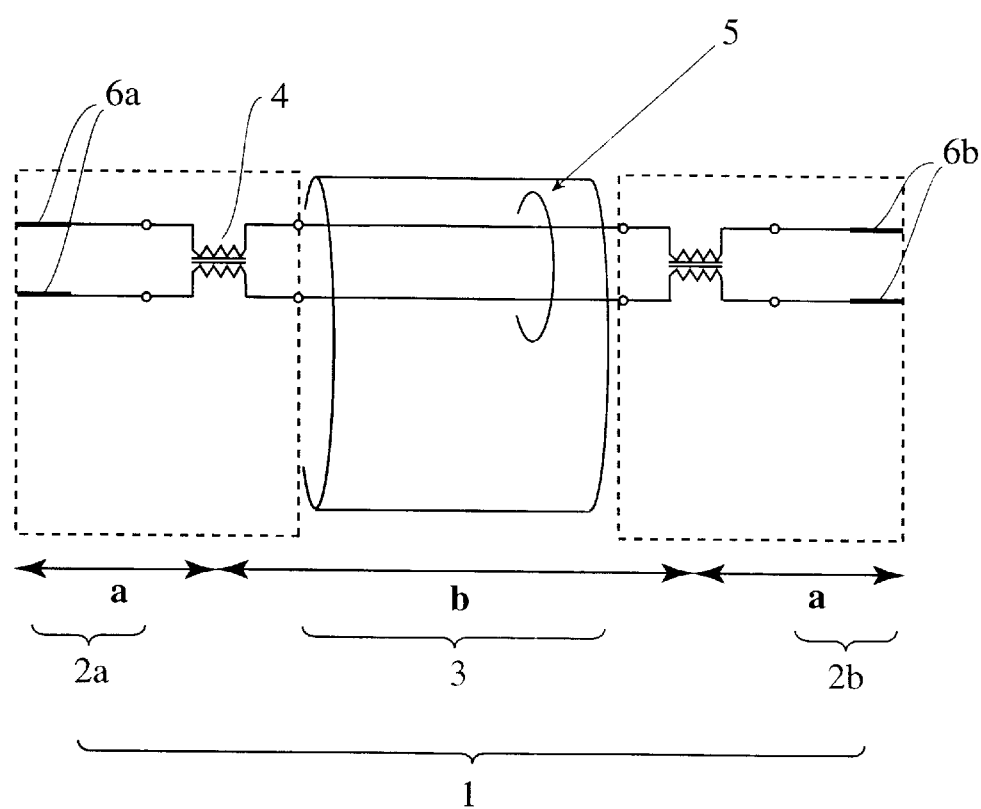
FIG. 3 is a schematic view showing a differential transmission cable according to another embodiment of the present invention.
Figure 4:
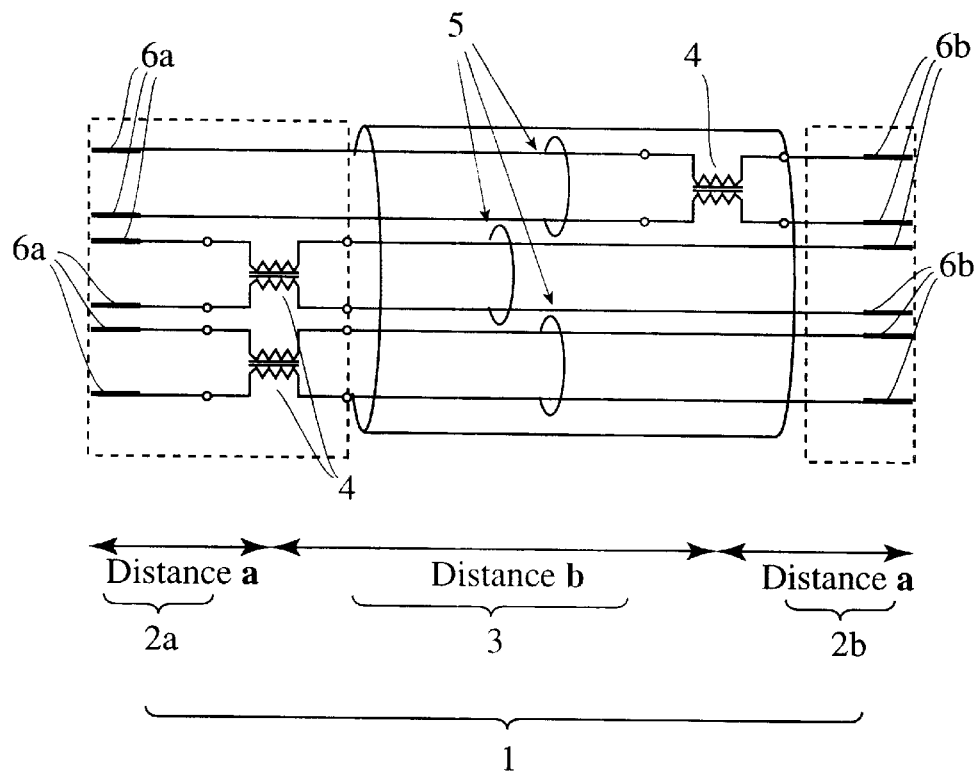
FIG. 4 is a schematic view showing a differential transmission cable according to a further embodiment of the present invention.

Further, the following differential transmission cables having various distances b were prepared.
(a) A differential transmission cable comprising a transmission transformer 4 near both ends thereof as shown in FIG. 3.
(b) A differential transmission cable comprising no transmission transformer.
(c) A differential transmission cable comprising a transmission transformer 4 in plural pairs of differential transmission lines 5 as shown in FIG. 4.

EVALUATION TEST 1

Figure 5:
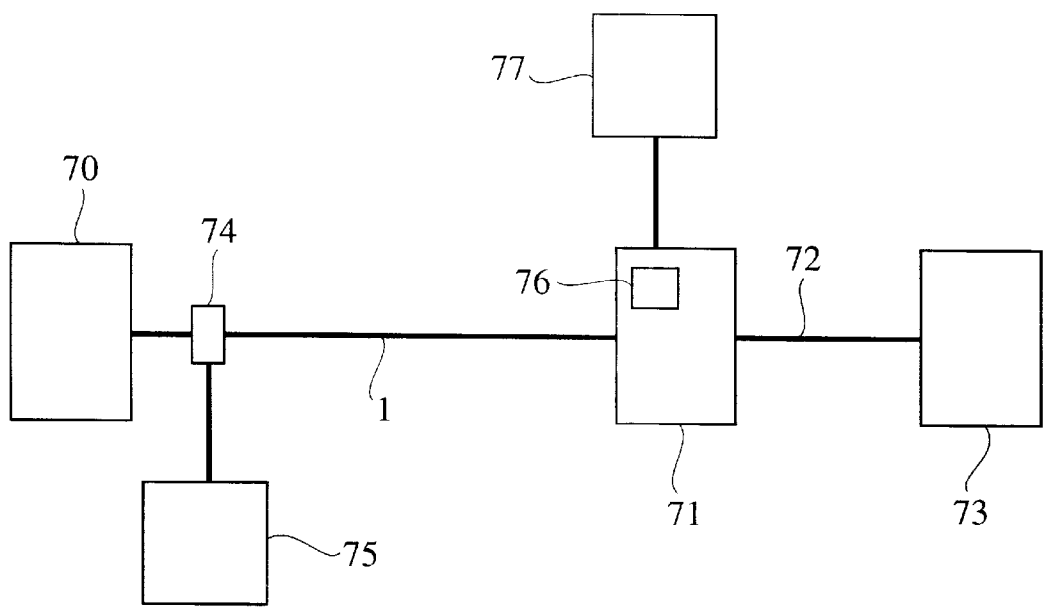
FIG. 5 is a schematic view showing an apparatus for evaluating the differential transmission cable.

To evaluate the performance of various types of the resultant differential transmission cables 1, as shown in FIG. 5, an evaluation circuit comprising a personal computer 70, a differential transmission cable 1, a buffer 71, a cable 72 and an electronic equipment 73 connected in series was used. the differential transmission cable 1 was provided with a differential noise detector 75 comprising a current transformer 74 as a sensor, and the buffer 71 was provided with a voltage prove 76, which was connected to a waveform observing apparatus 77.

(1) Measurement of Differential Noise

The destroyed balance of waveform in the differential transmission signals causes a differential noise. Because digital signals transmitted in an alternate form by a differential transmission method have opposite waveforms in a pair of differential transmission lines 5, there would be no output if electric signals were taken from the pair of differential transmission lines 5 simultaneously. However, because of deviation in voltage waveform between these lines, a conduction noise called "differential noise" is actually generated. This is a cause of a noise radiating from the differential transmission cable 1.

Thus, the conduction noise (differential noise) at 145 MHz was detected by the current transformer 74 and observed by the differential noise detector 75. The reason why the frequency was set at 145 MHz is that particularly harmful noise among the noises in USB (12 Mbps, full speed) are easily observed at this frequency. The change of the conduction noise due to the difference in structure of the differential transmission cable 1 is represented by dB, and its difference is represented by a relative value.

Figure 6:
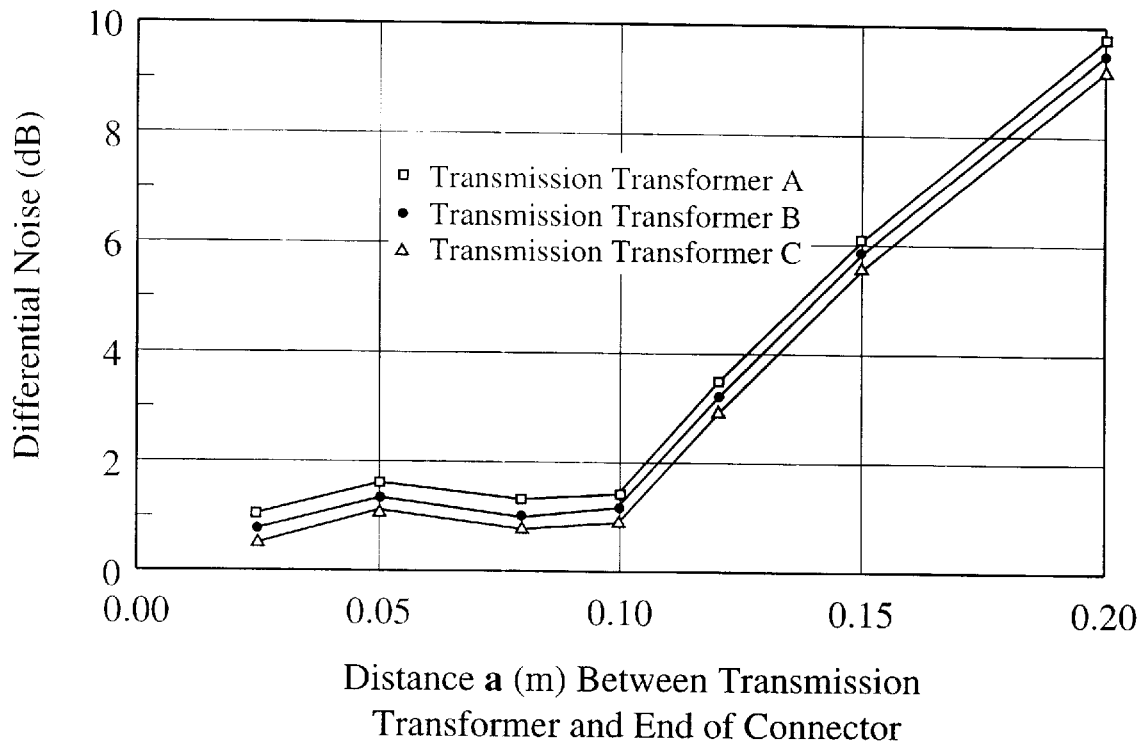
FIG. 6 is a graph showing the relation between a distance a between a center of the transmission transformer and an end of the connector and differential noise in the differential transmission cable of EXAMPLE 1.

Determined from the observation results is the relation between the distance a between the transmission transformer 4 and a tip end (tip ends of pin terminals 6) of the closest connector 2a and a differential noise. The results are shown in FIG. 6, in which the axis of abscissas represents the distance a between the transmission transformer 4 and a tip end of the closest connector 2a, and the axis of ordinates represents a differential noise (dB) at 145 MHz. As is clear from FIG. 6, the differential noise can be suppressed within 2 dB, when the distance a is within 0.1 m. A, B and C in the figure represent cases where transmission transformers 4 having coupling coefficients of 0.85, 0.92 and 0.95, respectively at 100 MHz were used. It has been confirmed that the transmission transformer 4 has a function of suppressing this differential noise, and that as long as the distance a is within 0.1 m, the differential noise is decreased irrespective of the type of the transmission transformer 4.

The wavelength corresponding to the frequency of the differential noise is calculated by the equation:

$$\text{Wavelength } \lambda = \text{velocity of light/frequency}$$

$$= 3 \times 10^8 / 145 \times 10^6 \approx 2 \text{ (m)}.$$

Accordingly, the upper limit (0.1 m) of the distance a corresponds to $(1/20) \lambda$. By actually changing the types of personal computers, it was confirmed that this evaluation concerning wavelength was correct. Though this EXAMPLE conducted experiments with respect to the transmission system of USB (12 Mbps, full speed), a harmful noise tends to appear on the side of higher frequency in a higher-speed differential transmission system such as IEEE1394 (400 Mbps). In such a case, the position of the transmission transformer 4 is preferably defined not by distances a and b but by a wavelength.

(2) Measurement of Radiation Noise

An anechoic chamber of FCC filing according to a 3-m method was used for the measurement of radiation noise emanating from the differential transmission cable 1. Measurement was conducted on how the level of radiation noise from the entire evaluation circuit apparatus described above changed depending on the structure of the differential transmission cable 1. To obtain clear effects, only difference (relative value) was measured. A value measured when the differential transmission cable 1 is completely covered with an electromagnetic wave-absorbing sheet is regarded as 0 dB, which is a reference level of the radiation noise. The electromagnetic wave-absorbing sheet used has a matching frequency of 150 MHz and a matching thickness of 2 mm.

Figure 7:
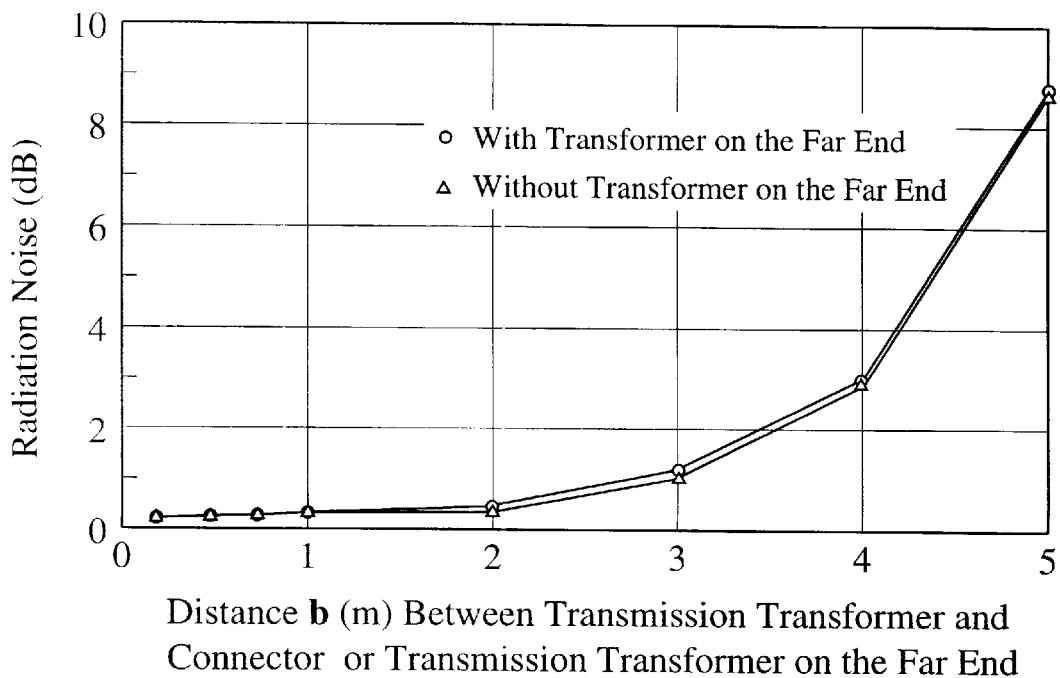
FIG. 7 is a graph showing the relation between a distance b between a center of the transmission transformer and a distant connector or a center of the other transmission transformer and differential noise in the differential transmission cable of EXAMPLE 1.

Determined from the observed results were the relations between the distance b from a center of the transmission transformer 4 to a tip end of the farthest connector 2b (ends of pin terminals 6b) or the farthest-disposed transmission transformer and the radiation noise. The results are shown in FIG. 7, in which the axis of abscissas represents the distance b and the axis of ordinates represents the radiation noise (dB) at 145 MHz. The transmission transformer used for the test shown in FIG. 7 had a coupling coefficient of 0.92 at 100 MHz. Also in FIG. 7, the plots indicated by ○ represent radiation noise when a plate piece of Ni—Cu—Zn ferrite ($\mu \approx 15$) was attached to a commercially available high-frequency transformer between its primary and secondary coils to reduce a-coupling coefficient thereof, and the plots indicated by Δ represent radiation noise when a laminate-type transmission transformer was used. In this experiment, the distance b is a distance to a transmission transformer when there is a transmission transformer near the far end, or a distance to a tip end of a connector 2b when there is only a connector 2b near the far end. The entire length of the cable 3 was at various levels up to 5 m. The distance a from the transmission transformer 4 to a tip end of the closest connector 2a (or when there is a transmission transformer near the far end, the distance a from this transmission transformer to a tip end of the farthest connector 2b) was set at 1.5 cm.

As is clear from FIG. 7, the distance b may be 4 m or less for radiation noise of 3 dB or less, 3 m or less for radiation noise of 1.5 dB or less, and 2 m or less for radiation noise of 0.5 dB or less. Also, there was substantially no difference between when there was a transmission transformer near the far end (a transmission transformer was mounted near each of both ends), and when a transmission transformer 4 was mounted near one end only.

It has been found from these results that seeing a cable provided with a transmission transformer 4 as a pseudo antenna, the position of nodes of an emitted wave can be controlled by changing the distance b from the transmission transformer 4 to the connector (or another transmission transformer), and radiation noise can be effectively suppressed when the distance b is 4 m or less. With respect to the distance b and wavelength $\lambda$, the distance b of 2 m, 3 m and 4 m substantially correspond to $\lambda$, $(3/2)\lambda$ and $2\lambda$, respectively.

(3) Evaluation of Quality of Waveform

Because the shorter rise time usually provides a better quality of waveform, the quality of waveform was evaluated by the rise time of a digital wave observed by a waveform observation apparatus 77. Here, the rise time was defined as a period of time from a point at which the voltage waveform of the digital wave observed by the waveform observation apparatus 77 reached 10% of its wave height to a point at which it reached 90% thereof. With the rise time of the original voltage waveform as a reference, the delay of the rise time being 0 second in that case, a relative delay time was determined when the differential transmission cable 1 of the present invention was inserted.

Mounted to a differential transmission cable 3 of 3 m in length were various transmission transformers 4 only at a position of 8 cm from the end of a connector 2. Transmission transformers 4 used had a coupling coefficient of 0.99 to 0.50 at 100 MHz. The relations between the coupling coefficient and the structures of the transformers 4 are as follows.

(a) Coupling Coefficient: 0.5

Obtained by using green sheets of 120 $\mu$m in thickness made of a Zr—Ca dielectric material with a coil pattern width of 80 $\mu$m and a printed pattern thickness of 20 $\mu$m, and two printed coil pattern layers in each coil.

(b) Coupling Coefficient: 0.65

Obtained by using green sheets of 120 $\mu$m in thickness made of a Ni—Cu—Zn ferrite (permeability $\mu$ of about 15) with a coil pattern width of 80 $\mu$m and a printed pattern thickness of 20 $\mu$m, and two printed coil pattern layers in each coil.

(c) Coupling Coefficient: 0.75

Obtained by using green sheets of 120 $\mu$m in thickness made of a Ni—Cu—Zn ferrite (permeability $\mu$ of about 100) with a coil pattern width of 80 $\mu$m and a printed pattern thickness of 20 $\mu$m, and two printed coil pattern layers in each coil.

(d) Coupling Coefficient: 0.85

Obtained by using green sheets of 70 $\mu$m in thickness made of a Ni—Cu—Zn ferrite (permeability $\mu$ of about 15) with a coil pattern width of 100 $\mu$m, and a printed pattern thickness of 10 $\mu$m, and four printed coil pattern layers in each coil.

(e) Coupling Coefficient: 0.92

Obtained by using green sheets of 50 $\mu$m in thickness made of a Ni—Cu—Zn ferrite (permeability $\mu$ of about 15) with a coil pattern width of 100 $\mu$m, and a printed pattern thickness of 7.5 $\mu$m, and four printed coil pattern layers in each coil.

(f) Coupling Coefficient: 0.95

Obtained by using green sheets of 50 $\mu$m in thickness made of a Ni—Cu—Zn ferrite (permeability $\mu$ of about 100) with a coil pattern width of 100 $\mu$m, and a printed pattern thickness of 7.5 $\mu$m, and four printed coil pattern layers in each coil.

(g) Coupling Coefficient: 0.96

Obtained by using green sheets of 30 $\mu$m in thickness made of a Ni—Cu—Zn ferrite (permeability $\mu$ of about 100) with a coil pattern width of 100 $\mu$m, and a printed pattern thickness of 5 $\mu$m and four printed coil pattern layers in each coil.

(h) Coupling Coefficient: 0.97

Obtained by using green sheets of 30 $\mu$m in thickness made of a Ni—Cu—Zn ferrite (permeability $\mu$ of about 100) with a coil pattern width of 80 $\mu$m, and a printed pattern thickness of 5 $\mu$m, and four printed coil pattern layers in each coil.

(i) Coupling Coefficient: 0.98

Obtained by using green sheets of 30 $\mu$m in thickness made of a Ni—Cu—Zn ferrite (permeability $\mu$ of about 100) with a coil pattern width of 80 $\mu$m, and a printed pattern thickness of 5 $\mu$m, and four printed coil pattern layers in each coil, each coil pattern having a two-turn spiral structure.

(j) Coupling Coefficient: 0.99

Using a commercially available high-frequency transformer having a wound coil structure (SMT, surface mount transformer).

Using a printer having a relatively high noise level as electronic equipment 73, the relations between the quality of waveform and a coupling coefficient were observed. The results are shown in FIG. 8, in which the axis of abscissas indicates a coupling coefficient and the axis of ordinates indicates a rise time.

Figure 8:
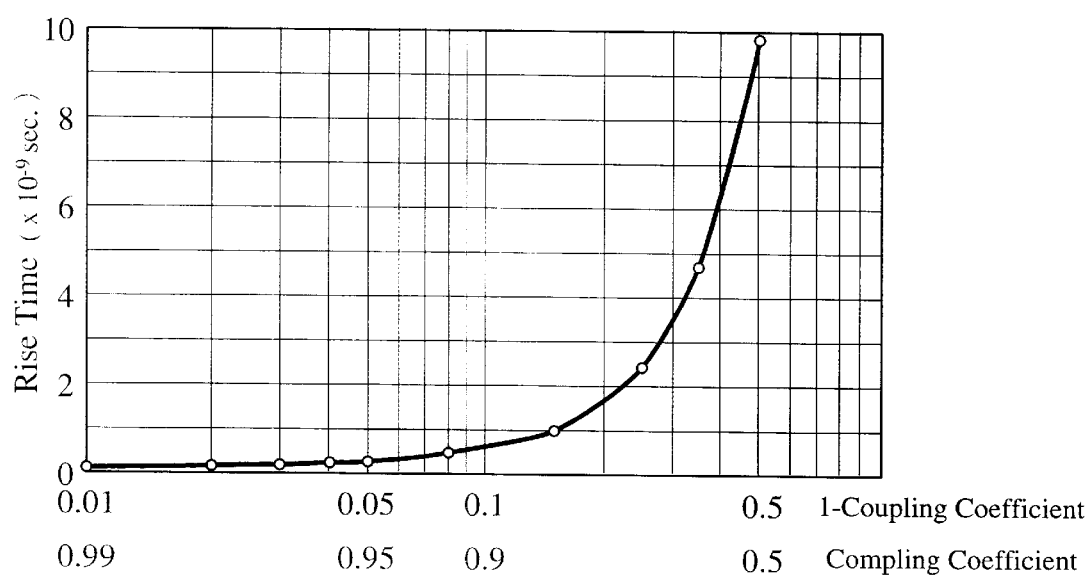
FIG. 8 is a graph showing the relation between a coupling coefficient of the transmission transformer and rise time in the differential transmission cable of EXAMPLE 1.

As is clear from FIG. 8, the quality of waveform was poor at a coupling coefficient of 0.50, as good as $5\times10^{-9}$ seconds or less at a coupling coefficient of 0.65 or more, better as $3\times10^{-9}$ seconds or less at a coupling coefficient of 0.75 or more, and extremely good at a coupling coefficient of 0.85 or more.

On the other hand, with respect to the relations between conduction noise and radiation noise, there was radiation noise proportional to conduction noise observed at a coupling coefficient of 0.99, indicating that there was no effect of suppressing a function as an antenna of the differential transmission cable 1. However, at a coupling coefficient of 0.98 or less, only radiation noise smaller than the conduction noise was observed, indicating that there was an effect of suppressing a function as an antenna of the differential transmission cable 1. Observed at a coupling coefficient of 0.95 or less was a large effect of suppressing a function as an antenna. Further, observed at a coupling coefficient of 0.92 or less was a remarkable effect of suppressing a function as an antenna.

As is clear from the above, the coupling coefficient of the transmission transformer 4 used for suppressing radiation noise while keeping the quality of waveform is preferably 0.65 to 0.98, more preferably 0.75 to 0.95, most preferably 0.85 to 0.92 at 100 MHz.

The coupling coefficient of the transmission transformer 4 can be in a range of 0.98 to 0.50 in an integral laminate type, and the transformer can be provided with a smaller coupling coefficient as the thickness of each laminate sheet increases. The coupling coefficient of the transmission transformer could be in a range of 0.99 to 0.92 in a wound coil type, and the coupling coefficient of 0.98 to 0.92 among them was obtained by adding a means for decreasing a coupling coefficient to a bypass of a magnetic circuit.

EXAMPLE 2

Constitution of Connector

Figure 10:
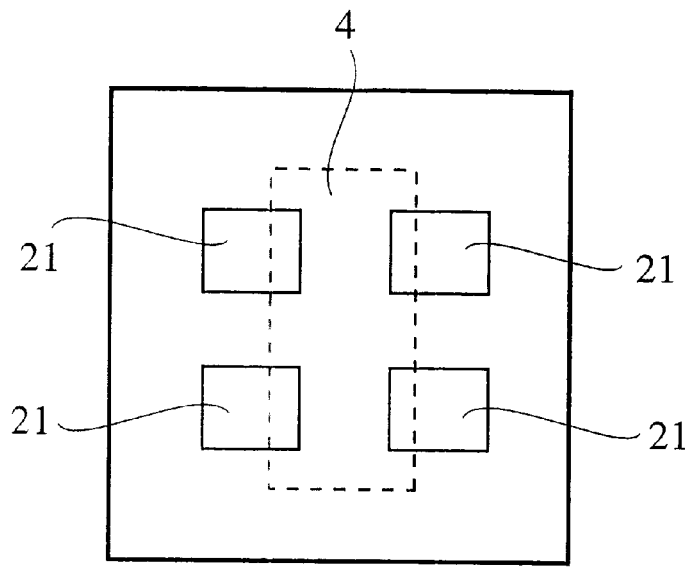
FIG. 10 is a plan view showing a substrate disposed in the connector.
Figure 11:
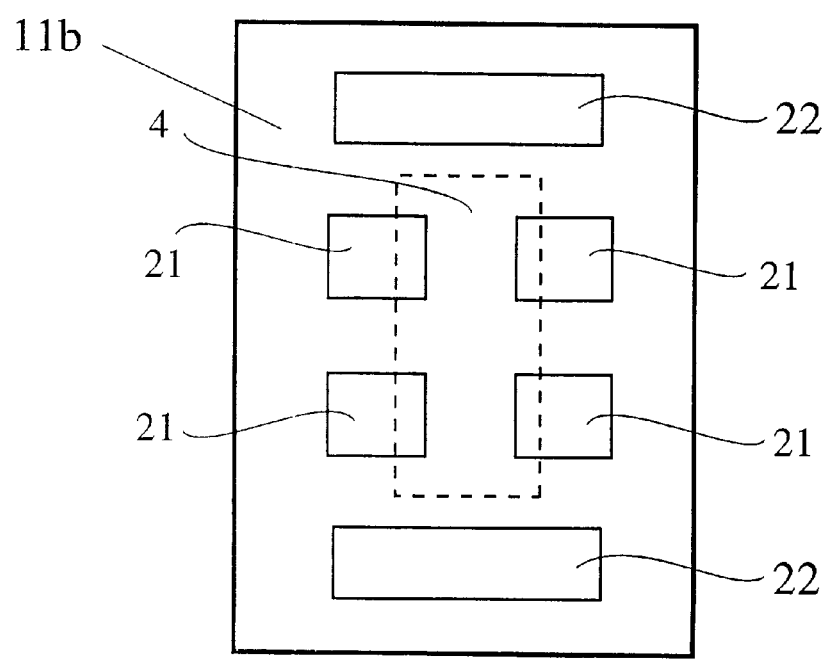
FIG. 11 is a plan view showing another example of a substrate for mounting a transmission transformer.

FIG. 9 shows a connector (series-A connector for USB cable) in a differential transmission cable, in which a transmission transformer was mounted. FIG. 10 shows a substrate used in FIG. 9, and FIG. 11 shows another example of a substrate.

In this EXAMPLE, a common-mode choke coil 4, one type of a transmission transformer, was mounted to lands 21 of a substrate 11a, and signal lines 5 and lead lines 12 of the USB cable 3 were connected to the lands 21 of the substrate 11a by soldering. With the lands 21, high reliability was achieved in soldering connection strength of the signal lines 5 and the lead lines 12 to the lands 21, and in soldering connection strength of the lands 21 to the common-mode choke coil 4.

By integrally resin-molding the substrate 11a provided with the cable 3 and the common-mode choke coil 4 except for tip portions of electric power lines 14 and lead lines 12, mechanical and electrical reliability can be improved. In this case, because the substrate 11a provided with the common-mode choke coil 4 is embedded in a resin molding 13, a commercially available connector housing 7a can be used without modification. Thus, there is no need to use a special connector for mounting the common-mode choke coil 4 in the differential transmission cable 1.

Next, after the terminals 15, 6a of the connector 2a were soldered to the electric power lines 14 and the lead lines 12, parts such as a shield plate, etc. were used to assemble the connector 2a.

Apart from the above method, there may be, for instance, a method of mounting a common-mode choke coil 4 to lands 21 of a substrate 11a, soldering signal lines 5 and lead lines 12 to the lands 21 of a substrate 11a, soldering terminals 15, 6a of a connector to the electric power lines 14 and the lead lines 12, and then resin-molding the substrate 11a provided with the cable 3 and the common-mode choke coil 4 together with a housing 7. A substrate inserted into the connector may be made of a material capable of withstanding a soldering step and a resin-molding step, and the shape shown in FIG. 10 is not restrictive. For instance, usable is a substrate 11b having a pair of lands 22 such that electric power lines 14 can be soldered, as shown in FIG. 11, and a commercially available land pattern may be used as lands.

As is clear from the above, an inexpensive, highly reliable differential transmission cable was obtained while fully keeping a high quality of digital signal waveform and drastically attenuating radiation noise.

EVALUATION TEST 2

Figure 12:
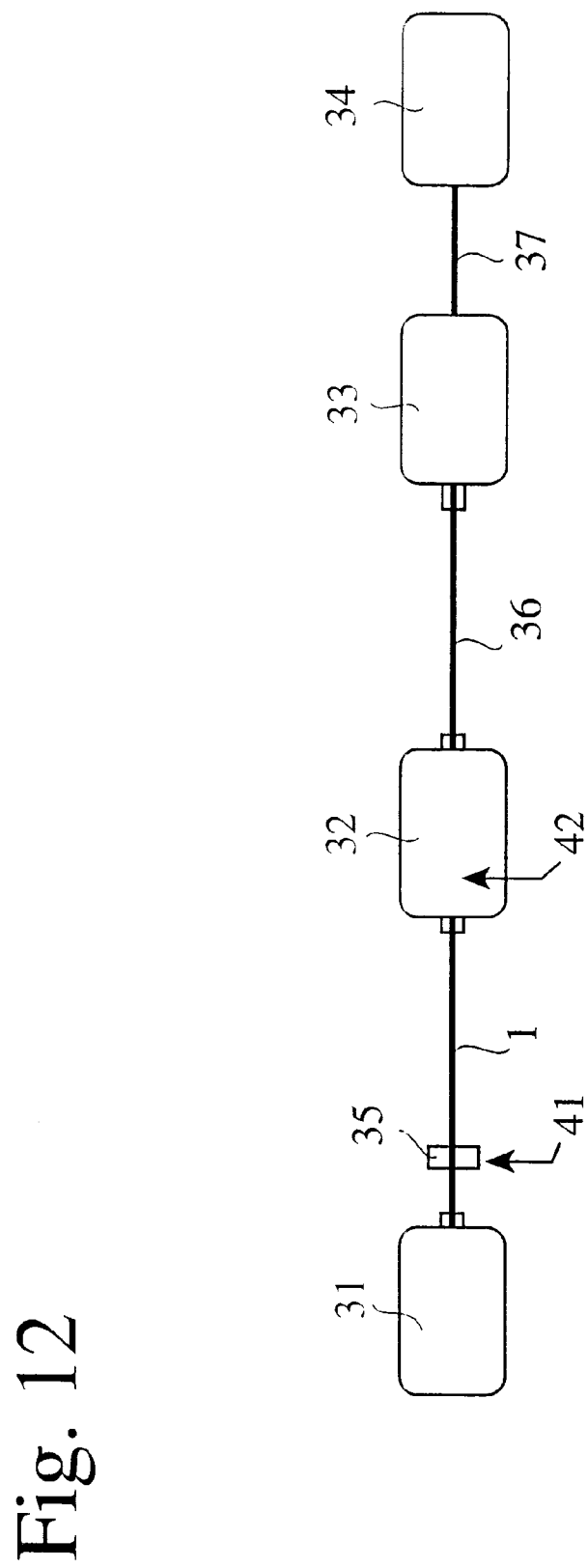
FIG. 12 is a schematic view showing an apparatus for evaluating the quality of waveform used in EXAMPLE 2.

Using an evaluation apparatus shown in FIG. 12, experiment was conducted to compare the performance of the above differential transmission cable 1 with that of a commercially available USB cable. In this evaluation apparatus, the differential transmission cable 1 was connected to a personal computer 31 and a USB hub 32, and the USB hub 32 was connected to a buffer 33 with a commercially available USB cable 36, one side of which was convertible to parallel. Also, the buffer 33 was connected to a printer 34 with a parallel cable 37. Further, a voltage probe was connected to IC input pins in the USB hub 32, and a sampling oscillograph 42 was connected to the voltage probe.

Mounted to the differential transmission cable 1 was a high-frequency current transformer 35, to which a spectrum analyzer 41 was connected. Assuming a radiation noise level measured with a commercially available USB cable as a reference (0 dB), a radiation noise level was determined using the differential transmission cable 1 of the present invention. This radiation noise is produced from a harmful conduction noise generated from a personal computer (observed at 145 MHz).

The quality of digital waveform can be evaluated by the rise time. Accordingly, the waveform of a digital wave were observed by the sampling oscillograph 42, to determine a rise time that was a period of time from a position at which a voltage waveform of the digital wave observed by sampling oscillograph 42 was 10% of its wave height to a position at which the voltage waveform reached 90% of the wave height. With a rise time delay of the commercially available USB cable as 0 second, the maximum delay and the minimum delay of the rise time were measured in the case of using the differential transmission cable 1 of the present invention.

The results of the above experiment are shown in Table 1. Also, Table 2 shows the characteristics of the common-mode choke coil 4 used in this EXAMPLE.

TABLE 1

Evaluation of characteristics of differential transmission cable

| | Sample | | | |
|---|---|---|---|---|
| Characteristics | EXAMPLE 2 | | Commercially Available USB Cable | |
| Transmission Transformer | CMC[1] | | No | |
| Noise Level (dB)[2] | −8.3 | | 0.0 | |
| Rise Time | Minimum | Maximum | Minimum | Maximum |
| Delay (ns) | 0.0 | 1.1 | 0.0 | 0.0 |

Note:
[1]Common-mode choke coil.
[2]Relative value.

Measurement frequency of radiation noise=145 MHz.

TABLE 2

| | Impedance (Ω) | | Coupling |
|---|---|---|---|
| Sample | Common Mode | Normal Mode | Coefficient |
| CMC[1] | 120 | 50 | 0.83 |

Note:
[1]Common-mode choke coil.

Measurement frequency=100 MHz.

As is clear from Table 1, the differential transmission cable of the present invention can dramatically attenuate radiation noise while fully keeping the quality of waveform of digital signals.

EXAMPLE 3

Other examples of connectors in the differential transmission cable of the present invention are shown in FIGS. 13 to 16. FIG. 13 shows a housing for a series-A connector of a USB cable. The housing 7b in this EXAMPLE is provided with a positioning projection holder 25a in a site 24 to which a common-mode choke coil is mounted, to prevent defects due to the displacement of the common-mode choke coil at the time of mounting. As long as the positioning projection holder 25a can secure a site into which the common-mode choke coil is inserted, it may have any shape. For instance, if it is in a shape having a hook 25b in an upper portion as shown in FIG. 14, defects due to the displacement of the common-mode choke coil at the time of mounting can drastically be suppressed. Incidentally, the holders 25a, 25b are preferably formed at the time of forming the housing.

After mounting connector terminals 15, 6a to this housing, the common-mode choke coil 4 is mounted to the housing, and signal lines, etc. of the USB cable are connected to the housing, to provide a differential transmission cable.

With lands 23 for mounting a common-mode choke coil to the housing 7b, high reliability can be achieved in soldering connection strength of the signal lines to the common-mode choke coil. Also, using connector terminals 6a as lands for mounting a common-mode choke coil, enough connection strength can be achieved between the connector terminals 6a and the common-mode choke coil, with reduced number of parts, resulting in the reduction of connector cost.

FIG. 15 shows a land 23 with a waist portion 26. With the waist portion 26, heat due to soldering of signal lines is not easily conducted to the lands on the side of the common-mode choke coil. Accordingly, a solder between the lands and the common-mode choke coil is melted, preventing defects such as insufficient contact, thereby providing a highly reliable differential transmission cable.

The lands 23 are preferably produced by integrally resin-molding metal pieces having excellent solderability (for instance, metal pieces having tin plating) with the housing 7b at the time of forming it, though the lands 23 may be fixed to the already formed housing 7b. Also, the lands 23 should not necessarily be formed by metal pieces, and they may be formed by plating.

FIG. 16 shows contact-pin-type lands mounted onto the side of the common-mode choke coil. With such lands 28, a soldering step can be eliminated in mounting the common-mode choke coil 4, thereby providing a further inexpensive differential transmission cable. Incidentally, as long as the lands 28 are in contact with outer terminals 27 of the common-mode choke coil 4, the lands 28 may have any shape. Also, because the lands 28 are sites in which electric signals are transmitted, they should have a small contact resistance with little variation with time. Therefore, the lands 28 are preferably plated with gold.

As a result of comparing the performance of a differential transmission cable thus produced with a commercially available USB cable, the same results as in Table 1 (showing evaluation results of EXAMPLE 2) were obtained.

EXAMPLE 4

Evaluation of Joint

FIG. 17 shows one example of a joint used for connecting a cable to a personal computer. A common-mode choke coil 4 is mounted to a substrate 11a on a female connector 60b, and terminals 6a, 15 of a series-A male connector 60a are soldered to the terminals 6b, 16 of the female connector 60b and the substrate 11a via lead lines 17. With this structure, high reliability in soldering is secured between the lead lines 17 and the common-mode choke coil 4. Next, the male connector 60a, the female connector 60b and the substrate 11a are integrally resin-molded, to assemble a joint with parts such as shield plates, etc. Because the substrate 11a provided with the common-mode choke coil 4 is embedded in a molding portion 13, high reliability is achieved. Further, because housings 7a, 7c of commercially available connectors may be used without modifications, there is no need to produce a special connector for mounting a common-mode choke coil 4 into the joint.

To evaluate the performance of the joint thus produced, comparison was carried out between when the joint was inserted between a commercially available USB cable 1 and a personal computer 31, and when only a commercially available USB cable 1 was used. The results are substantially the same as those of EXAMPLE 2 shown in Table 1.

Apart from the above, the same effects are obtained even when a connector 2b of the differential transmission cable 1 in EXAMPLE 2 is changed to a female connector and used as a joint. Differential noise can also be suppressed by inserting a substrate provided with a common-mode choke coil into a female connector of a joint instead of inserting the substrate provided with a common-mode choke coil into a male connector of the joint, and making the length of the joint as short as 0.1 m or less.

FIG. 18 shows another example of the joint. In this EXAMPLE, a common-mode choke coil is mounted to a male connector 60a. By mounting a positioning projection holder 25a in a site 24 to which the common-mode choke coil is mounted, it is possible to suppress defects due to the displacement of the common-mode choke coil at the time of mounting. The positioning projection holder 25a may have any shape, as long as it can secure a position of inserting the common-mode choke coil. After mounting the common-mode choke coil to the housing 7b, the housings 7b, 7c are connected to the lead lines 17 and integrally resin-molded, to assemble a joint with parts such as shield plates, etc.

To evaluate the performance of the joint thus produced, comparison was carried out between when the joint was inserted between a commercially available USB cable 1 and a personal computer 31, and when only a commercially available USB cable 1 was used. The results are substantially the same as those of EXAMPLE 2 shown in Table 1.

Apart from the above, the same effects are obtained even when a connector 2b of the differential transmission cable 1 in EXAMPLE 3 is changed to a female connector and used as a joint. Also, the same effects are obtained by using a commercially available housing for a male connector 2a of a joint, and mounting a common-mode choke coil to the housing of a female connector 2b after the housing of a female connector 2b is changed to have a shape capable of mounting the common-mode choke coil, with the joint made as short as 0.1 m or less.

EXAMPLE 5

Another Example of Connector for Differential Transmission Cable

FIG. 19 shows a substrate that is inserted into a connector and resin-molded. Differing from the substrates in the above EXAMPLES, this substrate may comprise other noise-suppressing and controlling parts such as chip beads in addition to the common-mode choke coil.

The substrate 11c has a structure that the common-mode choke coil 4 is mounted to lands 21 for differential transmission lines and the chip beads 9 are mounted to lands 29 for electric power lines. When this substrate 11c is inserted into the connector in place of the substrate 11a used in EXAMPLE 2 or 4, it is not only possible to obtain noise-suppressing effects as described in the above EXAMPLES, but also can the differential-mode noise flowing through the electric power lines be suppressed.

As another example, a polymer-type PTC thermistor may be inserted into a connector together with a common-mode choke coil. In this case, (a) a substrate having a common-mode choke coil mounted to its top surface and a polymer-type PTC thermistor mounted to its bottom surface is inserted into a connector in place of the substrate 11a in EXAMPLE 2 or 4, or (b) a housing 7b provided with a common-mode choke coil 4 is inserted into a connector together with a substrate provided with only a polymer-type PTC thermistor. The advantage of inserting this part is that the device is protected from breakage when overvoltage, which may be generated at the time of connecting a device having a power supply by a hot plug function of USB, IEEE1394, etc., flows. Also, when a chip barrister or a chip surge absorber is inserted, the device is protected from overvoltage such as static electricity, etc.

According to this EXAMPLE, by inserting a common-mode choke coil and the other noise-suppressing parts into a connector, the benefits of the other noise-suppressing parts can be obtained in addition to those of the common-mode choke coil.

What is claimed is:

1. A differential transmission cable comprising:
   a cable having (1) at least one pair of differential transmission lines, (2) at least one transmission transformer, and (3) a first connector and a second connector respectively positioned at the ends of said cable, said at least one transmission transformer being positioned along the length of said cable between a tip end of said first connector and a tip end of said second connector,
   wherein the distance between a center of said at least one transmission transformer and the tip end of said first connector is 0.1 m or less, and
   wherein one of (1) the distance between a center of said at least one transmission transformer and the tip end of said second connector is 0.5 to 4 m and (2) the distance between a center of said at least one transmission transformer and a center of another transmission transformer is 0.5 to 4 m.

2. The differential transmission cable according to claim 1 further comprising a noise-suppressing part other than said transmission transformer in said connector.

3. The differential transmission cable according to claim 1, wherein said at least one transmission transformer has a coupling coefficient of 0.65 to 0.98 at 100 MHz.

4. The differential transmission cable according to claim 1 wherein one transmission transformer is disposed in the vicinity of one end of each pair of differential transmission lines.

5. The differential transmission cable according to claim 1 wherein said differential transmission cable comprises a pair of transmission transformers, each transmission transformer being disposed in the vicinity of an end of each pair of said differential transmission lines.

6. The differential transmission cable according to claim 1, wherein said at least one transmission transformer has an integrally sintered laminate structure.

7. The differential transmission cable according to claim 1, wherein said at least one transmission transformer is a common-mode choke coil.

8. The differential transmission cable according to claim 1, wherein said at least one transmission transformer is fixed to one of said at least one pair of differential transmission lines, said first connector, and said second connector.

9. The differential transmission cable according to claim 8, wherein said at least one transmission transformer is mounted to a substrate, which is resin-molded in one of said first connector and said second connector.

10. The differential transmission cable according to claim 9, wherein said at least one transmission transformer is disposed in a housing of one of said first connector and said second connector, said housing being provided with lands for mounting said at least one transmission transformer and a holder for positioning said at least one transmission transformer.

11. The differential transmission cable according to claim 10, wherein part of said lands for mounting said transmission transformer is constituted by terminals of said connector.

12. The differential transmission cable according to claim 10, wherein said land for mounting said transmission transformer is provided with a waist portion.

13. The differential transmission cable according to claim 9, wherein said holder for positioning said transmission transformer is in a shape having a hook in an upper portion.

14. A differential transmission cable comprising:
   a cable having (1) at least one pair of differential transmission lines, (2) at least one transmission transformer, and (3) a first connector and a second connector respectively positioned at the ends of said cable, said at least one transmission transformer being positioned along the length of said cable between a tip end of said first connector and a tip end of said second connector,
   wherein the distance between a center of said at least one transmission transformer and the tip end of said first connector is $\lambda/20$ or less, and wherein one of (1) the distance between a center of said at least one transmission transformer and the tip end of said second connector is $\lambda/4$ to $2\lambda$ and no other connector is provided between said second connector and said at least one transmission transformer, and (2) the distance between a center of said at least one transmission transformer and a center of another transmission transformer is $\lambda/4$ to $2\lambda$, and
   wherein $\lambda$ represents the wavelength of a noise that radiates from said differential transmission cable, which is to be attenuated.

15. The differential transmission cable according to claim 14, wherein said at least one transmission transformer has a coupling coefficient of 0.65 to 0.98 at 100 MHz.

16. The differential transmission cable according to claim 14, wherein one transmission transformer is disposed in the vicinity of one end of each pair of differential transmission lines.

17. The differential transmission cable according to claim 14, wherein said differential transmission cable comprises a pair of transmission transformers, each transmission transformer being disposed in the vicinity of an end of each pair of said differential transmission lines.

18. The differential transmission cable according to claim 14, wherein said at least one transmission transformer has an integrally sintered laminate structure.

19. The differential transmission cable according to claim 14, wherein said at least one transmission transformer is a common-mode choke coil.

20. The differential transmission cable according to claim 14, wherein said at least one transmission transformer is fixed to one of said at least one pair of differential transmission lines, said first connector, and said second connector.

21. The differential transmission cable according to claim 20, wherein said transmission transformer is mounted to a substrate, which is resin-molded in one of said first connector and said second connector.

22. The differential transmission cable according to claim 21, wherein said at least one transmission transformer is disposed in a housing of one of said first connector and said second connector, said housing being provided with lands for mounting said at least one transmission transformer and a holder for positioning said at least one transmission transformer.

23. The differential transmission cable according to claim 22, wherein said land for mounting said transmission transformer is provided with a waist portion.

24. The differential transmission cable according to claim 14, further comprising a noise-suppressing part other than said transmission transformer in said connector.

* * * * *